March 26, 1935. C. H. DIEHL 1,995,297
AUTOMATIC SAFETY SIGNAL
Filed Feb. 9, 1931 3 Sheets-Sheet 3

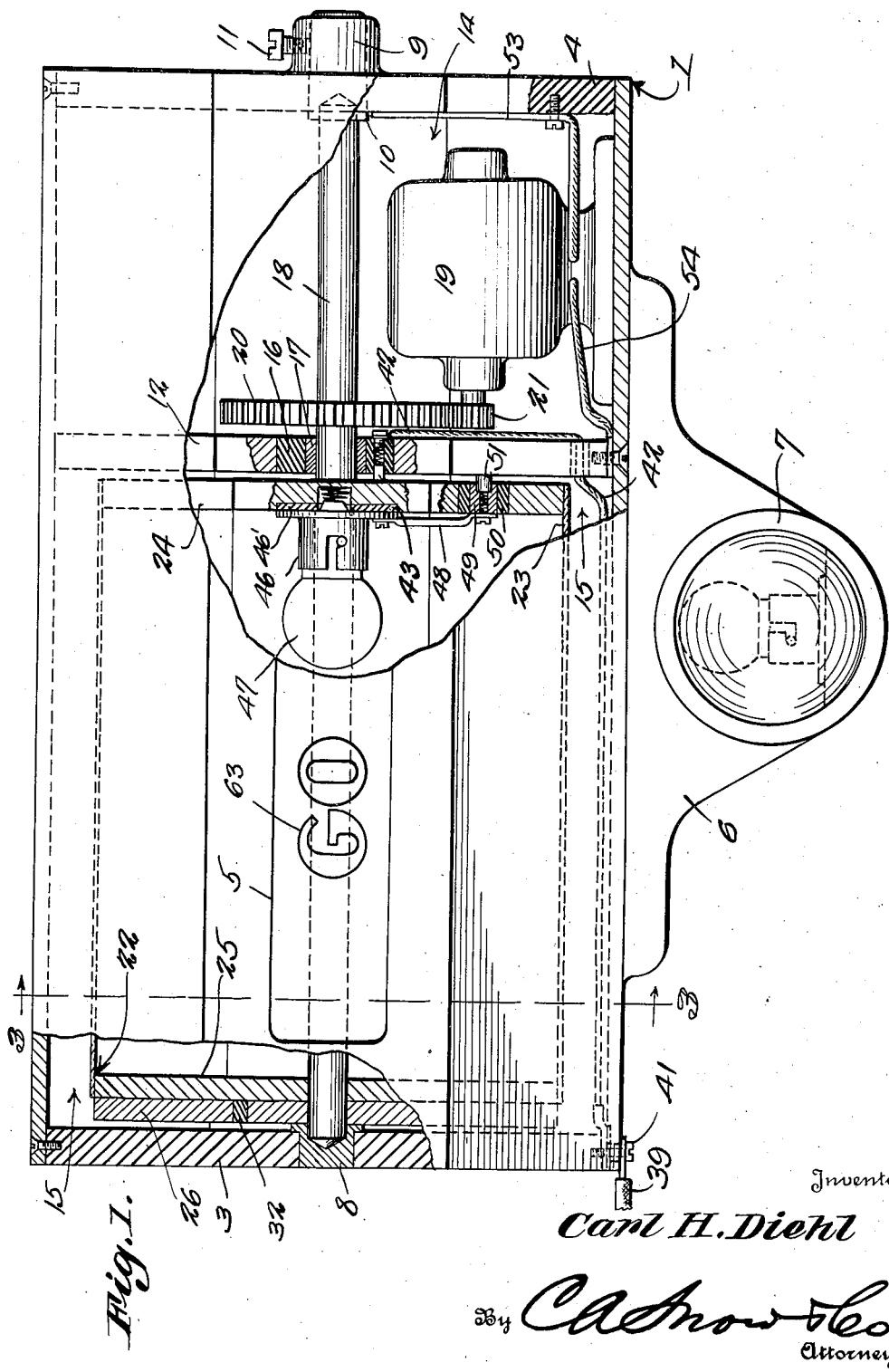

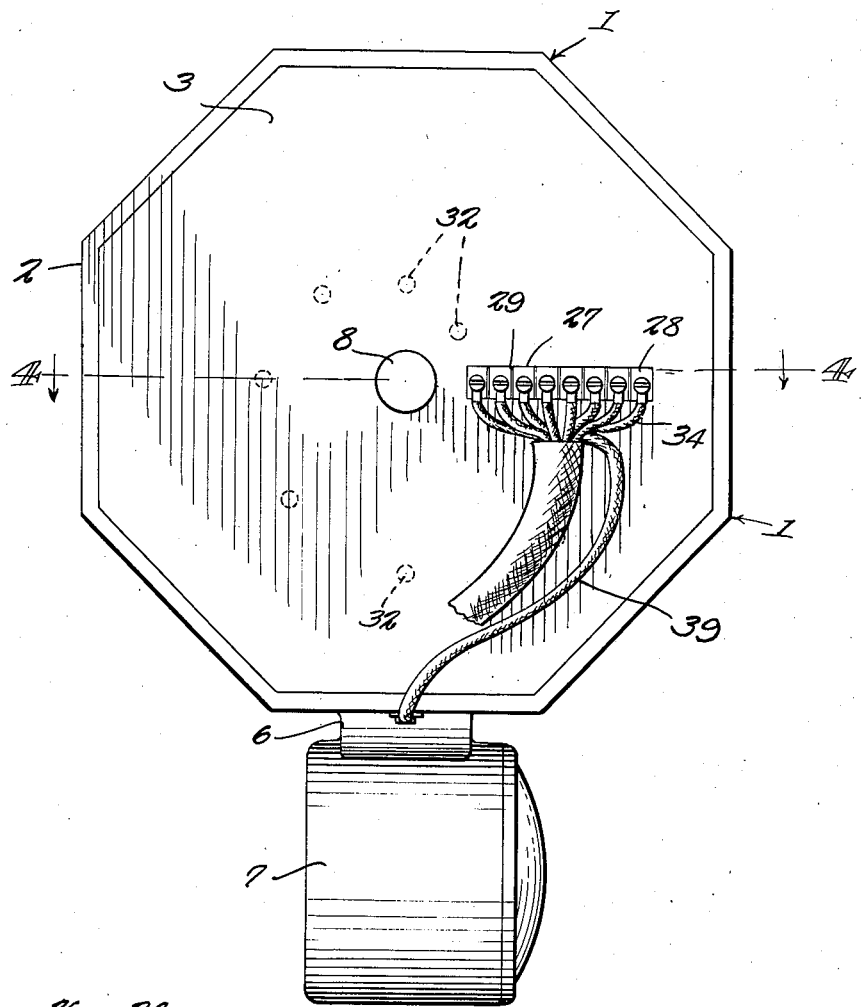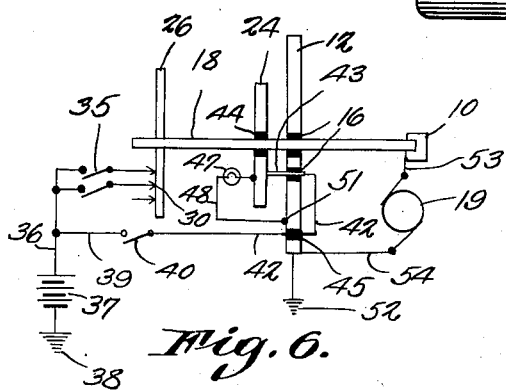

Inventor
Carl H. Diehl
By C. A. Snow & Co.
Attorneys.

Patented Mar. 26, 1935

1,995,297

UNITED STATES PATENT OFFICE 1,995,297

AUTOMATIC SAFETY SIGNAL

Carl Henry Diehl, Lawrence Park, Pa.

Application February 9, 1931, Serial No. 514,609

1 Claim. (Cl. 177—327)

The device forming the subject matter of this application is adapted to be used as a signal, either on a vehicle or as the user may desire.

The device comprises a rotor and means for actuating the rotor, and one object of the invention is to provide novel means for stopping the rotor at the will of an operator.

A further object of this invention is to supply novel means for illuminating the rotor when it is desirable to do so.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Figure 1 shows in elevation, a device constructed in accordance with the invention, parts being broken;

Figure 2 is an end elevation;

Figure 6 is a circuit diagram.

Figure 3:
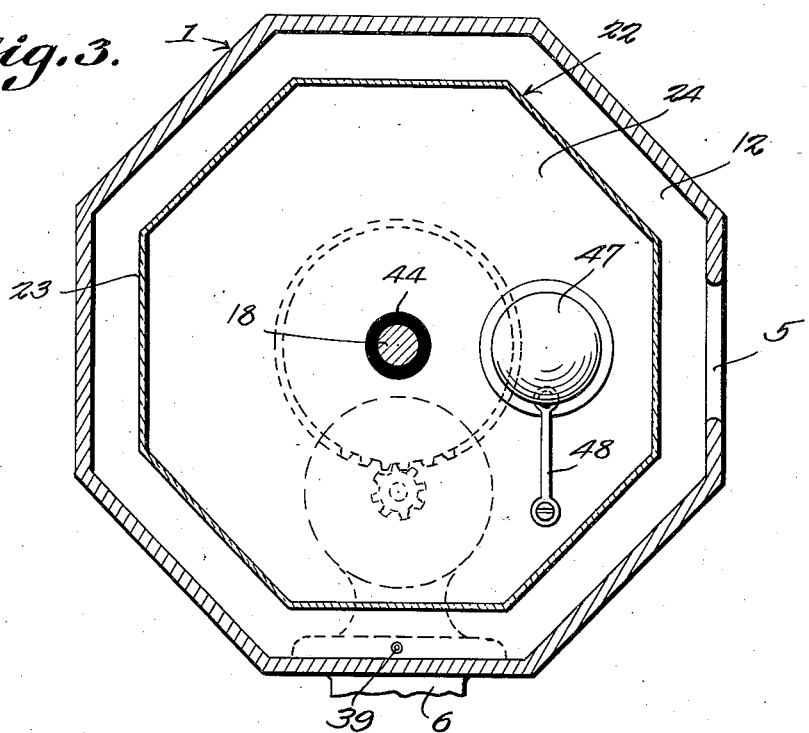
Figure 3 is a section on the line 3—3 of Figure 1.

In carrying out the invention, there is provided a casing 1, shown as octagonal in cross section, although the casing may be of any desired shape. The tubular body 2 of the casing 1 preferably is made of metal, and carries insulating heads 3 and 4. The body 2 of the casing 1 has an elongated horizontal opening 5 which is shown in Figure 1.

On the bottom of the body 2, there is a bracket 6 carrying a housing 7. The housing 7 may contain a tail lamp, if the device is used on a vehicle, no details of the wiring of the tail lamp being given, because that is a matter lying well within the skill of any electrician.

A metal bearing 8 is mounted in the head 3 of the casing 1. The head 4 of the casing 1 has a socket 9, in which a metal bearing 10 is held by a set screw 11, or otherwise.

A metal partition 12 is secured in the casing 1 and thus divides the casing into a compartment 14 and a compartment 15. The partition 12 carries an insulating block 16 provided with a metal bearing 17.

In the bearings 8, 17 and 10, a shaft 18 is journaled for rotation. An electric motor 19 is located in the compartment 14 and is secured to the body 2 of the casing 1. There is a gear wheel 20 on the shaft 18, the gear wheel meshing with a pinion 21, on the shaft of the electric motor 19.

Within the compartment 15 is located a rotor that is mounted on the shaft 18 to turn therewith. The rotor 22 preferably is octagonal in cross section, although it may have as many or as few sides as the manufacturer wishes. The rotor 22 comprises a shell 23, preferably made up of a plurality of glass plates which may be colored as desired. The glass plates that make up the shell 23 of the rotor 22 are marked, as at 63 in Figure 1, in any suitable manner, depending upon the use to which the device is put. The rotor 22 includes an outer end member 25, made of metal, and an inner end member 24, made of metal, and a metal supplemental plate 26 cooperating with the outer end member 25.

Figure 4:
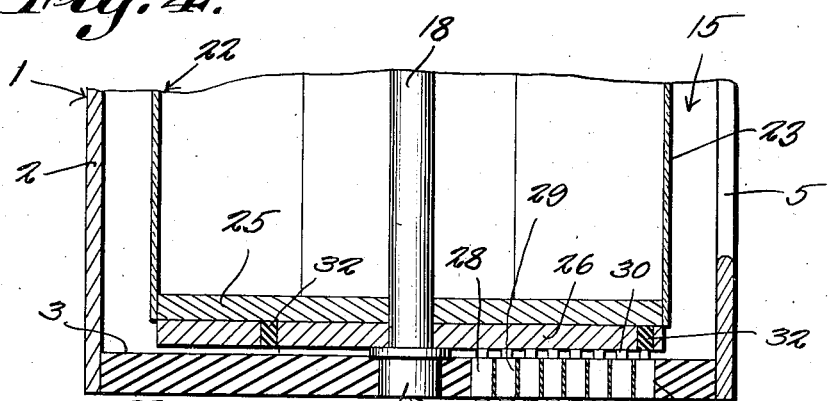
Figure 4 is a fragmental section on the line 4—4 of Figure 2.
Figure 5:
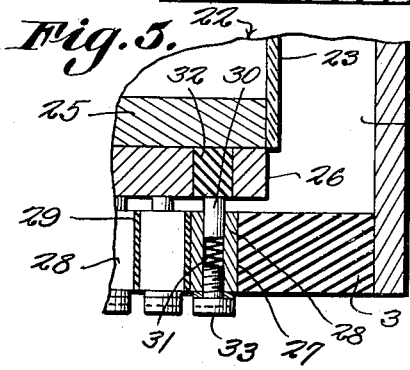
Figure 5 is a sectional detail enlarged from Figure 4.

Referring to Figures 2, 4 and 5, it will be observed that a slot 27 is formed in the head 3 of the casing 1. In the slot 27 are disposed a plurality of metal sleeves 28, arranged in a straight line, if desired, and insulated from each other, as shown at 29. Contact members 30 are slidably mounted in the sleeves 28 and are urged by compression springs 31 to bear against the metal supplemental plate 26 of the rotor 22. In the plate 26 of the rotor 22 are disposed insulating pieces or dead points, there being one of these insulating pieces 32 for each of the contact members 30. There are as many contact members 30, and as many insulating pieces 32, as there are sides to the rotor 22, and Figure 2 shows that the insulating pieces 32 are so arranged that each one of them will come into engagement with the appropriate one of the contact members 30, as the corresponding side of the shell 23 of the rotor 22 comes into position behind the opening 5 of the casing 1, as shown in Figure 1 of the drawings.

Binding screws 33 or the like are mounted in the outer ends of the sleeves 28 and retain conductors 34, there being a switch 35 (Figure 6) for each of the conductors 34, the switch mechanism being located wherever desired, depending upon the use to which the device forming the subject matter of this application is put. The switches 35 are connected to a conductor 36 in which is interposed a battery 37 or other source of electrical energy, the battery 37 being shown as grounded on one side, as indicated at 38 in Figure 6. In general, the device may be wired up in various ways, without departing from the spirit of the invention.

A conductor 39 is branched off the conductor 36, and is connected at 41 (Figure 1) to a conductor 45 that extends along the bottom of the casing 1, within the casing. The conductor 42 passes through the partition 12 of the casing 1, and is insulated, as shown at 45 in Figure 6, where it passes through the partition. The conductor 42 is joined to a spring-pressed contact member 43 supported slidably in the partition 12, but insulated from the partition 12 by the block 16. The contact member 43 bears against the inner end member 24 of the rotor 22, the inner end member 24 being insulated at 44 from the conducting shaft 18.

On the inner surface of the end member 24 of the rotor 22 is a socket 46 carrying an electric lamp 47 located within the rotor 22. As shown at 46' in Fig. 1, the terminals of the lamp are insulated from each other. One side of the lamp is connected electrically with the first conducting disk 24 of the rotor 22, as shown in dotted line in Figure 1. The opposite side of the lamp 47 is joined electrically, by means of the socket 46, and a connection 48, with a metal sleeve 49 mounted in the end member 24 of the rotor 22, but insulated therefrom, as shown at 50. In the sleeve 49 there is a spring-pressed first brush 51 which bears against the partition 12 of the casing 1, the partition being grounded, as shown at 52 in Figure 6. A conductor 53 is connected to the bearing 10 and to one side of the motor 19, a conductor 54 being connected to the opposite side of the motor and to the grounded partition 12 of the casing 1.

The circuit for the motor 19 includes the ground 38, the source 37 of electrical energy, the conductor 36, one of the switches 35, the corresponding contact member 30, the second conducting disk 26 of the rotor 22, the shaft 18, the bearing 10, the conductor 53, the motor 19, the conductor 54, the fixed conducting member 12 of the casing 1, and the ground 52.

The circuit for the lamp 47 comprises the ground 38, the source 37 of electrical energy, the conductor 36, the conductor 39, the switch 40, the conductor 42, the second brush 43, the inner end member 24 of the rotor 22, the lamp 47, the socket 46, the connection 48, the sleeve 49, the contact 51, the partition 12 of the casing 1, and the ground 52. In the event that the device is operated in the day time, or if, for any other reason, it is not desired to illuminate the lamp 47, then the switch 40 can be left open. When, however, the switch 40 is closed, the lamp 47 is lighted, and the lamp illuminates the particular portion of the shell 43 of the rotor 22 which carries the inscription 63 which is visible through the opening 5, as shown in Figure 1.

The operator selects the particular inscription which he wishes to have presented at the opening 5, and closes the corresponding switch 35. Then, the motor 19 is put into operation, and rotation imparted to the shaft 18 by way of the pinion 21 and the gear wheel 20. When the shaft 18 is turned, the rotor 22 is rotated also, and it continues to rotate until the selected one of the insulating pieces, or dead points 32 on the supplemental plate 26 of the rotor 22, comes into engagement with the corresponding contact member 30, as shown in Figure 5. Then the motor 19 stops, and the rotor 22 stops, also, with the selected inscription 30 visible through the opening 5, as shown in Figure 1. The contact members 30, other than the one contact member shown in Figure 5, are in engagement at this time, with the conducting plate 26 of the rotor. Consequently, by closing another of the switches 35, the motor circuit may be closed, and the rotor 22 turned to present at a different inscription or marking at the opening 5.

The device is simple in construction, and will remain in working order for a long time, without expert attention, and when repairs are necessary, they can be readily made. The device may be used as a signal on automobiles, as a signal at a street corner, or elsewhere, to be operated by a traffic officer, or for advertising purposes, and for many other ends which will be understood readily by those skilled in the art.

The rotor can be automatically controlled by electrical contactors placed on the movable parts of the vehicle, if the operator or manufacturer wishes.

Having thus described the invention, what is claimed is:

In a device of the class described, a support, a conducting shaft journaled on the support, a rotor comprising a first conducting disk and a second conducting disk, the second conducting disk being secured to the shaft in electrical engagement with the shaft, means for securing the first conducting disk to the shaft in insulated relation to the shaft, an electric lamp, means for securing said lamp to the first conducting disk, a first brush, means for mounting the first brush on the first conducting disk in insulated relation thereto, means for connecting the first brush electrically with one side of said lamp, a conducting member, means for mounting said conducting member fixedly on the support, the first brush being in electrical contact with the fixedly-mounted conducting member, and the fixedly-mounted conducting member being of such size as to permit the electrical contact between the first brush and the fixedly-mounted conducting member to be maintained at all times, a second brush in electrical engagement with the first conducting disk, means for mounting the second brush on the fixedly-mounted conducting member in insulated relation thereto, a circuit for said lamp, including the second brush, the first conducting disk, said lamp, the first brush, and the fixedly-mounted conducting member, contact members in electrical engagement with the second conducting disk and mounted on the support at different distances from the axis of rotation of the shaft, insulating pieces on the second conducting disk and arranged in concentric circles but spaced circumferentially, the radii of said circles corresponding to the distances of the contact members from the axis of rotation of the shaft, an electric motor, means for connecting the motor operatively with the shaft, a motor circuit comprising the shaft, the second conducting disk and one of the contact members which is spaced from the corresponding insulating piece, and means for closing the motor circuit through said one of the contact members and through another of said contact members, at the will of an operator.

CARL HENRY DIEHL.